US00RE40822E

(19) United States
(12) Reissued Patent
Lai

(10) Patent Number: US RE40,822 E
(45) Date of Reissued Patent: Jul. 7, 2009

(54) CALIBRATION METHOD FOR SLICE LEVEL OF ZERO CROSS SIGNAL AND METHOD OF PRODUCING TRACK-CROSSING SIGNAL

(76) Inventor: Ronnie Lai, 8F, No. 535, Chung-Cheng Rd., Hsin-Tien City, Taipei Hsien (TW)

(21) Appl. No.: 11/843,875

(22) Filed: Aug. 23, 2007

Related U.S. Patent Documents

Reissue of:
(64) Patent No.: 6,934,234
Issued: Aug. 23, 2005
Appl. No.: 10/117,096
Filed: Apr. 8, 2002

(30) Foreign Application Priority Data

Apr. 11, 2001 (TW) ..... 90108704

(51) Int. Cl.
*G11B 7/005* (2006.01)

(52) U.S. Cl. ..... 369/53.35; 369/59.17
(58) Field of Classification Search ..... None
See application file for complete search history.

(56) References Cited

U.S. PATENT DOCUMENTS

| | | | |
|---|---|---|---|
| 5,351,222 | A | 9/1994 | Ikeda et al. |
| 5,359,585 | A | 10/1994 | Tanoue et al. |
| 5,392,273 | A | 2/1995 | Masaki et al. |
| 2001/0006494 | A1 | 7/2001 | Park |
| 2001/0010673 | A1 | 8/2001 | Chan |
| 2001/0017834 | A1 | 8/2001 | Kravtchenko et al. |

FOREIGN PATENT DOCUMENTS

| | | | |
|---|---|---|---|
| JP | 03290875 | A | 12/1991 |
| JP | 07034951 | A | 2/1995 |

*Primary Examiner*—Peter Vincent Agustin
(74) *Attorney, Agent, or Firm*—Perkins Coie LLP

(57) ABSTRACT

A calibration method for a slice level of zero cross signal and a method of producing zero cross signal are disclosed. In this invention, the positive cycle and the negative cycle of the zero cross signal are sampled to obtain an error value related to the slice level due to asymmetry of the zero cross signal. By this invention, the asymmetry between the positive cycle and the negative cycle of the zero cross signal can be adjusted.

20 Claims, 4 Drawing Sheets

CALIBRATION METHOD FOR SLICE LEVEL OF ZERO CROSS SIGNAL AND METHOD OF PRODUCING TRACK-CROSSING SIGNAL

Matter enclosed in heavy brackets [ ] appears in the original patent but forms no part of this reissue specification; matter printed in italics indicates the additions made by reissue.

FIELD OF THE INVENTION

The present invention relates to a calibration method for a slice level of zero cross signal and a method of producing track-crossing signal. More particularly, the invention relates a calibration method for slice level of radio frequency zero cross (RFZC) signal and a method of adjusting the slice level of the RFZC signal by sampling half cycle of RFZC signal.

BACKGROUND OF THE INVENTION

Due to the advancement of science and continuous development of multimedia, CD-ROM drive has become very popular. The main advantage of CD is high capacity to save data so the speed and the stabilization of CD-ROM drive are very important. When a CD-ROM drive reads data, there is a need for track seeking and track locking. Therefore, the performance of track seeking and track locking will affect the speed and stabilization of CD-ROM drive. In track seeking and locking, radio frequency ripple (RFRP) signal and RFZC signal are very important.

Referring to FIG. 1, that shows a circuit diagram of generating radio frequency zero cross signal. As shown in FIG. 1, an intermediate signal is created by the RFRP through an analog to digital converter. The intermediate signal is calculated through a low pass filter simulated by a digital signal processor (DSP) 20. Then the output of the DSP 20 is transformed through the digital to analog converter DAC 30 to obtain an analog signal. The analog signal is defined as a slice level (V_SL) of the RFRP, and then the RFZC signal is generated from the V_SL signal and the RFRP signal through a comparative amplifier.

Reference is made to FIG. 2, which shows a timing diagram of slice level of radio frequency zero cross signal. In track locking, V_SL is created by passing RFRP signal through a low pass filter. However, a digital signal processor may simulate the function of the low pass filter. When the CD-ROM drive begins, a stable V_SL will be generated after a settling time caused by the low pass filter. The settling time is about forty-six milliseconds.

Reference is made to FIG. 3, which shows a conventional circuit of generating the RFZC signal. As shown in FIG. 3, the comparative amplifier consists of a first resistor 110, a second resistor 112, a third resistor 114, a fourth resistor 116, a fifth resistor 118, a capacitor 120 and an amplifier 122. A terminal of the first resistor 110 is coupled with RFRP signal and another terminal of the first resistor 110 is coupled with a terminal of the second resistor 112. Another terminal of the second resistor 112 is coupled with the positive input of the amplifier 122. The positive input point of the amplifier 122 is further coupled with one terminal of the third resistor 114. Another terminal of the third resistor 114 is coupled with the output of the amplifier 122. A terminal of the forth resistor 116 is coupled with the output of the amplifier 122. Another terminal of the forth resistor 116 is coupled with a power supply (5 volts). One terminal of the fifth resistor 118 is coupled with V_SL and another terminal of the fifth resistor 118 is coupled with the negative input of the amplifier 122 which is coupled with one terminal of the capacitor 120. Another terminal of the capacitor 120 is grounded.

The RFZC signal is generated based on the RFRP signal and V_SL through the comparative amplifier. The main function of the comparative amplifier is to compare the RFRP signal with V_SL for generating the RFZC signal. When V_SL is not correct, the RFZC signal will be incorrect so that the CD-ROM drive will have some wrong or bad performance.

Reference is made to FIG. 4, which shows a diagram of generating the RFZC signal from the RFRF signal and the V_SL in the prior art. The RFZC signal will be different according to different V_SL. In fact, in order to prevent the RFRP signal from noise interference, a region on the timing diagram is defined around the V_SL. The V_SL is in the middle of the region and the region will be changed according to V_SL. In the region, the peak level is a threshold high voltage (V_H) of Schmitt trigger and the bottom level is the threshold low voltage (V_L) of Schmitt trigger. As shown in FIG. 4, the RFZG signal will be positive when the RFRP signal is higher than the V_H level of the Schmitt trigger. When the RFRP signal is lower than the V_L level of the Schmitt trigger, the RFZC signal will be negative. Therefore, the positive cycle and the negative cycle of the RFZC signal are relative to V_SL. In general, it is better for the positive cycle and the negative cycle of RFZC to be symmetric.

How to compensate for the slice level has been disclosed. In that prior art, the disadvantage of the prior method of compensating for the slice level does not respond to the change of the track-crossing signal dynamically. Therefore, the bias voltage will need more time to follow the change of the track-crossing signal when the change of the track-crossing signal is rather violent.

V_SL is used in the track-locking process of the servo system in the optical storage drive (for example, CD-ROM drive, CD-R/RW drive, DVD-ROM drive, DVD player, DVD-R drive, DVD-RW drive, DVD-RAM drive, DVD+RW drive and the like). In general, the DSP unit simulates the function of digital low pass filter to get the V_SL. However, there are two disadvantage of using low pass filter. The first disadvantage is that the settling time is too long and the second disadvantage is that the Schmitt trigger will induce the positive cycle and the negative cycle of the RFZC signal to be asymmetrical. The two disadvantages will affect the performance of the CD-ROM drive and induce the malfunction of CD-ROM drive. Therefore, an effective method is needed to solve this problem.

SUMMARY OF THE INVENTION

In view of the background of the invention described above, a low pass filter will induce the settling time too long and the positive cycle and the negative cycle of the radio frequency zero cross signal to be asymmetrical. The present invention focuses on the need above and provides a calibration method for a slice level of radio frequency zero cross signal to correct the conventional disadvantage.

It is one purpose of this invention to provide a calibration method for a slice level. In the invention, the positive cycle and the negative cycle of the RFZC signal is sampled to calculate the error value of slice level and the asymmetry between the positive cycle and the negative cycle of the radio frequency zero cross signal are adjusted according to the change of the slice level.

In accordance with the aforementioned purposes of this invention, the invention provides a calibration method for a slice level. It consists of the following steps. First, the positive cycle and the negative cycle of the zero cross signal are sampled to calculate the error value from the difference between the two cycles. Adding the error value to the slice level will generate a next slice level.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In the embodiment, the RFZC signal is sampled and counted by a high frequency, for example, about 1.4 MHz. Therefore, the count number in a positive cycle is defined as NOP and the count number in a negative cycle is defined as NON. The definition of NOP and NON are shown in FIG. 5.

Figure 1:
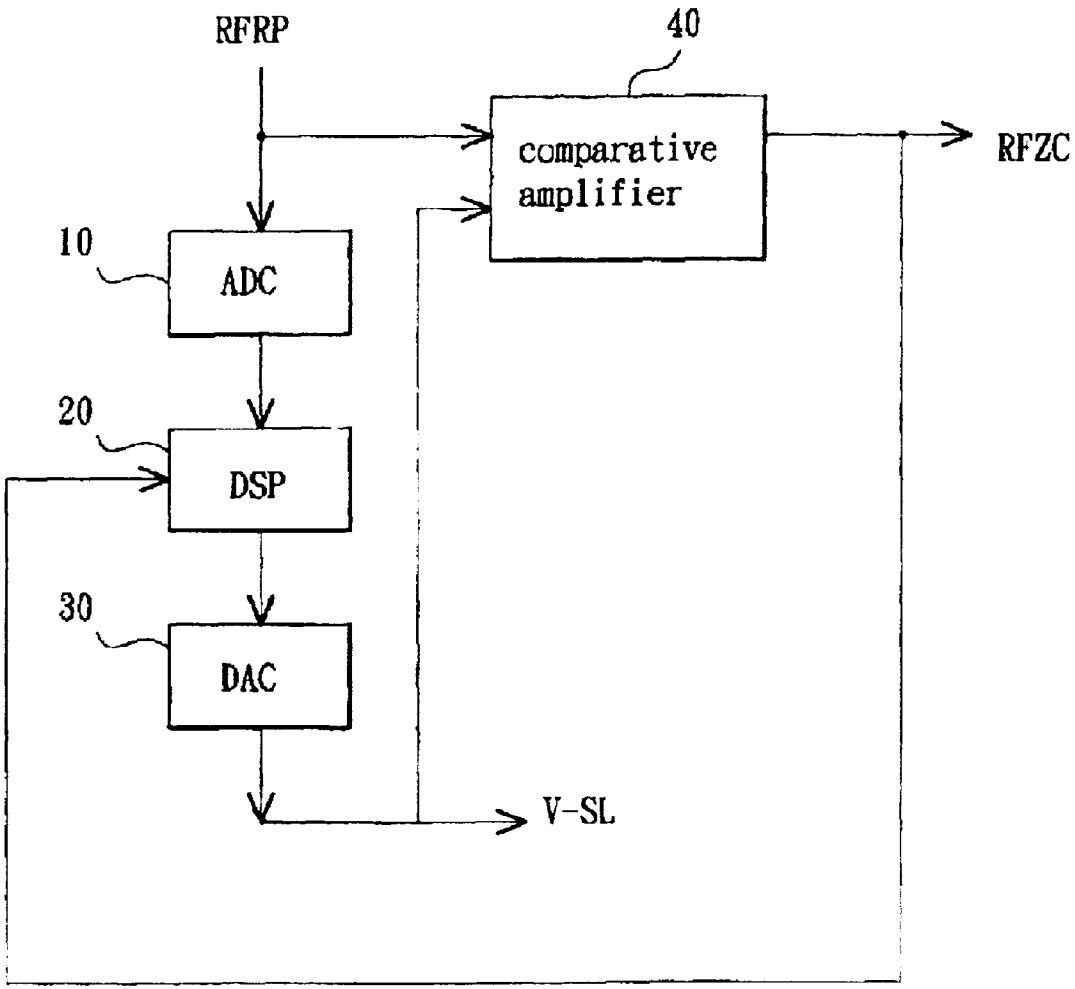
FIG. 1 (PRIOR ART)
FIG. 1 is circuit diagram of generating radio frequency zero cross signal.
Figure 2:
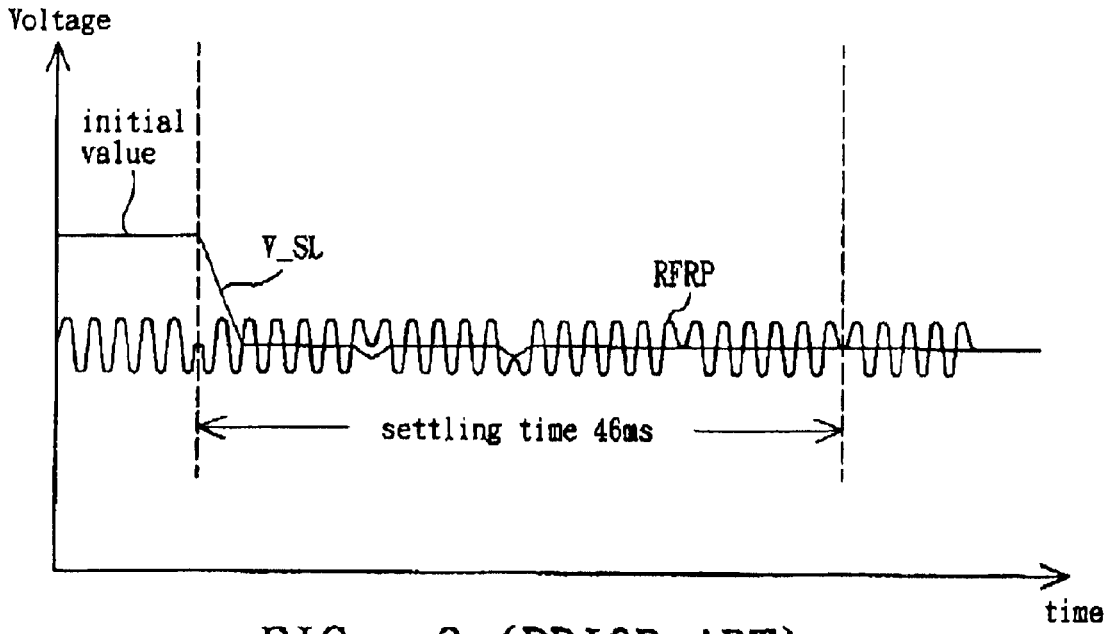
FIG. 2 (PRIOR ART)
FIG. 2 is a timing diagram of slice level of radio frequency zero cross signal.
Figure 3:
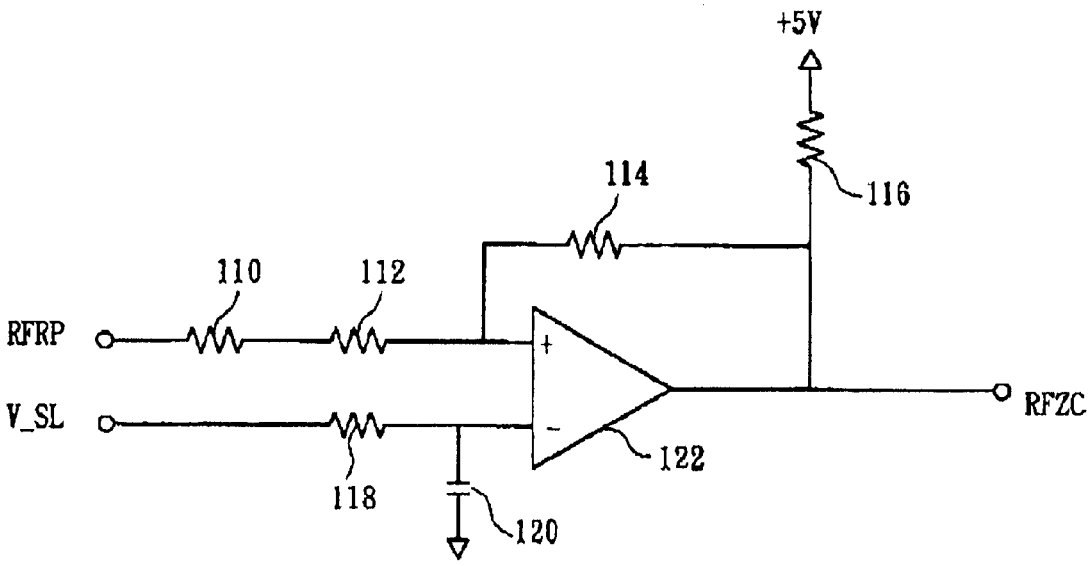
FIG. 3 (PRIOR ART)
FIG. 3 is a conventional circuit of generating the RFZC signal.
Figure 4:
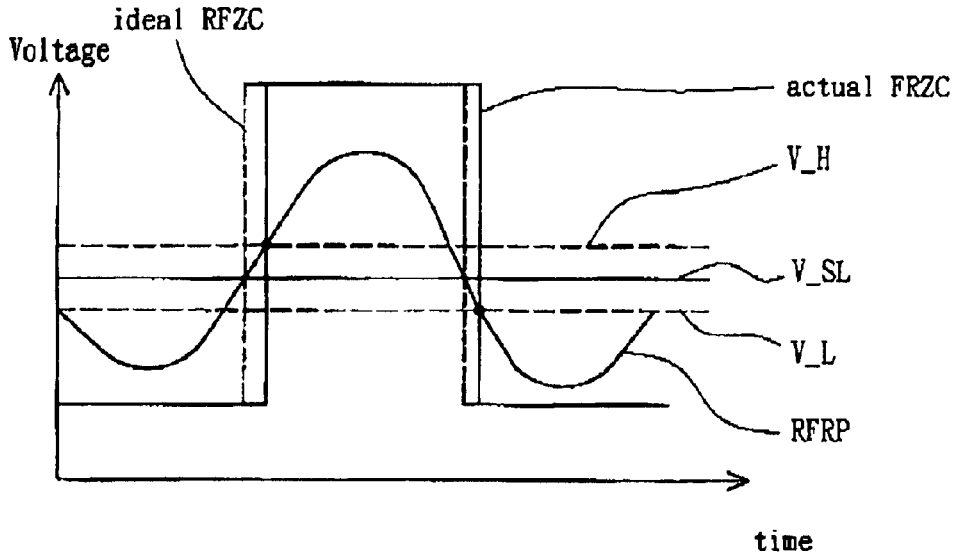
FIG. 4 (PRIOR ART)
FIG. 4 is a diagram of generating the RFZC signal from the RFRP signal and the V_SL in the prior art.
Figure 5:
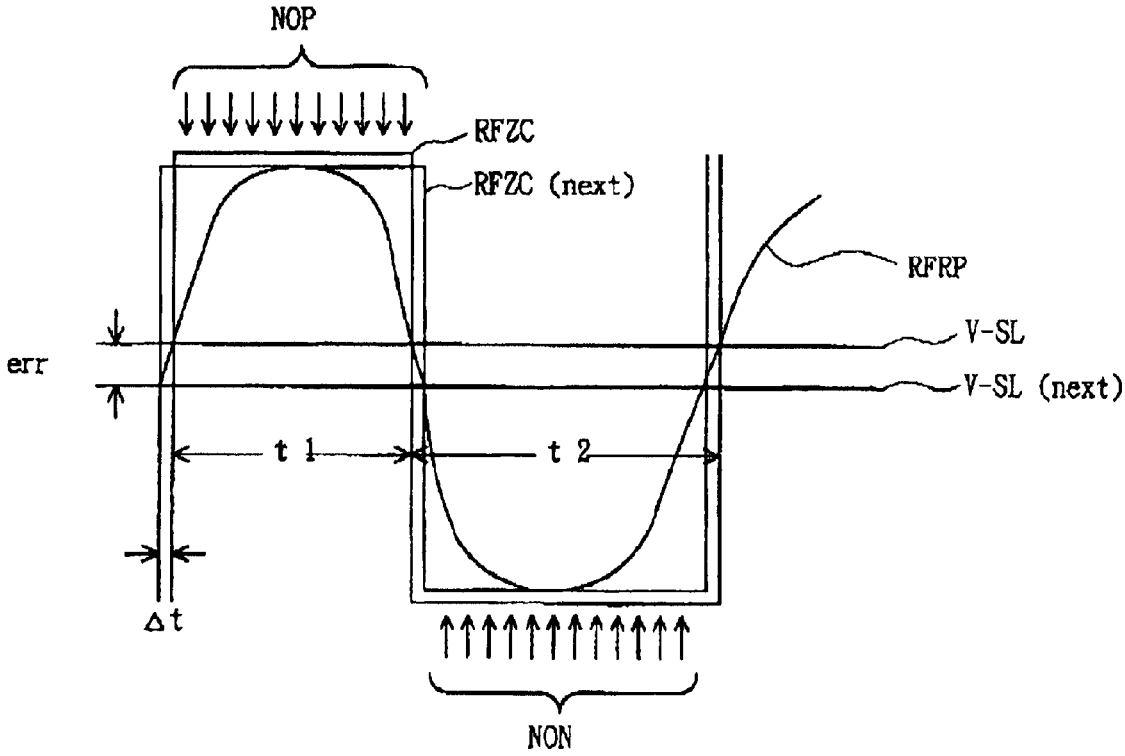
FIG. 5 is a timing diagram of the slice level according to an embodiment of the present invention.

Referring to FIG. 5, which shows a timing diagram of the slice level according to an embodiment of the present invention. According to the description above, the digital signal processor generates a V_SL from the RFRP signal and then the RFZC signal is generated by the RFRP signal and the V_SL through the comparative amplifier. Afterward, sampling the RFZC signal and calculation are performed. Then the result of calculation is delivered to the digital signal processor. According to the calculation equation, the error value is calculated by the digital signal processor to adjust a next V_SL.

The equations of calculating the RFRP signal and the RFZC signal to adjust the next error value of V_SL are as follows.

1. Referring to FIG. 5, the error value between the current and the next V_SL is obtained as:

$$\mathrm{err} = \frac{R_{pp}}{2} \times \sin(\omega \times \Delta t) \tag{1}$$

wherein $R_{pp}$ is the peak-to-bottom value of the RFRP signal. ω is the angular frequency (ω=2πf) and the Δt is the difference between the positive cycle and the negative cycle.

2. Because the Δt is so small so the equation (1) can be rewritten to $$\mathrm{err} = \frac{R_{pp}}{2} \times \omega \times \Delta t \tag{2}$$

3. The frequency can be presented to $$f = \frac{\mathrm{sample_frequency}}{\mathrm{NOP} + \mathrm{NON} + 1} \tag{3}$$

wherein the sample_frequency is the sample frequency for the RFZC signal.

4. Δt is the difference between the positive cycle and the negative cycle so the Δt can be rewritten to $$\Delta t = \frac{t_2 - t_1}{4} \tag{4}$$

wherein the $t_1$ is a time interval for the positive cycle and the $t_2$ is a time interval for the negative cycle.

Because of $$t_1 = \frac{\mathrm{NOP}}{\mathrm{sample_frequency}} \text{ and } t_2 = \frac{\mathrm{NON}}{\mathrm{sample_frequency}}$$

so the equation (4) can be presented to $$\Delta t = \frac{\mathrm{NON} - \mathrm{NOP}}{4 \times \mathrm{sample_frequency}} \tag{5}$$

6. From the equation (2), (3), (5), we can obtain $$\mathrm{err} = R_{pp} \times \frac{\pi}{4} \times \frac{\mathrm{NON} - \mathrm{NOP}}{\mathrm{NON} + \mathrm{NOP} + 1} \tag{6}$$

In the equation (6), (NON+NOP+1) is a sampling number from sampling a full cycle of the RFRP signal. In the equation (6), the result err can be added to the calculation of digital signal processor to generate the next V_SL. Therefore, according the equation (6), when the NOP equals the NON, the err will be zero. In this moment, the next V_SL will not be changed. That means the positive cycle and the negative cycle of the RFZC are symmetric. When the difference between the positive cycle and the negative cycle is large, the err becomes large so that the change of the V_SL becomes great to catch the change of the positive cycle and the negative cycle quickly. Otherwise, in order to compensate for the change of the positive cycle and the negative cycle efficiently, the equation (6) is $$\mathrm{err} = \frac{\mathrm{NON} - \mathrm{NOP}}{\mathrm{NON} + \mathrm{NOP} - 1} \times \frac{1}{\mathrm{NON}}$$

$$\mathrm{err} = \frac{\mathrm{NON} - \mathrm{NOP}}{\mathrm{NON} + \mathrm{NOP} + 1} \times \frac{1}{\mathrm{NOP}}$$

during the negative cycle and during the positive cycle.

Figure 6:
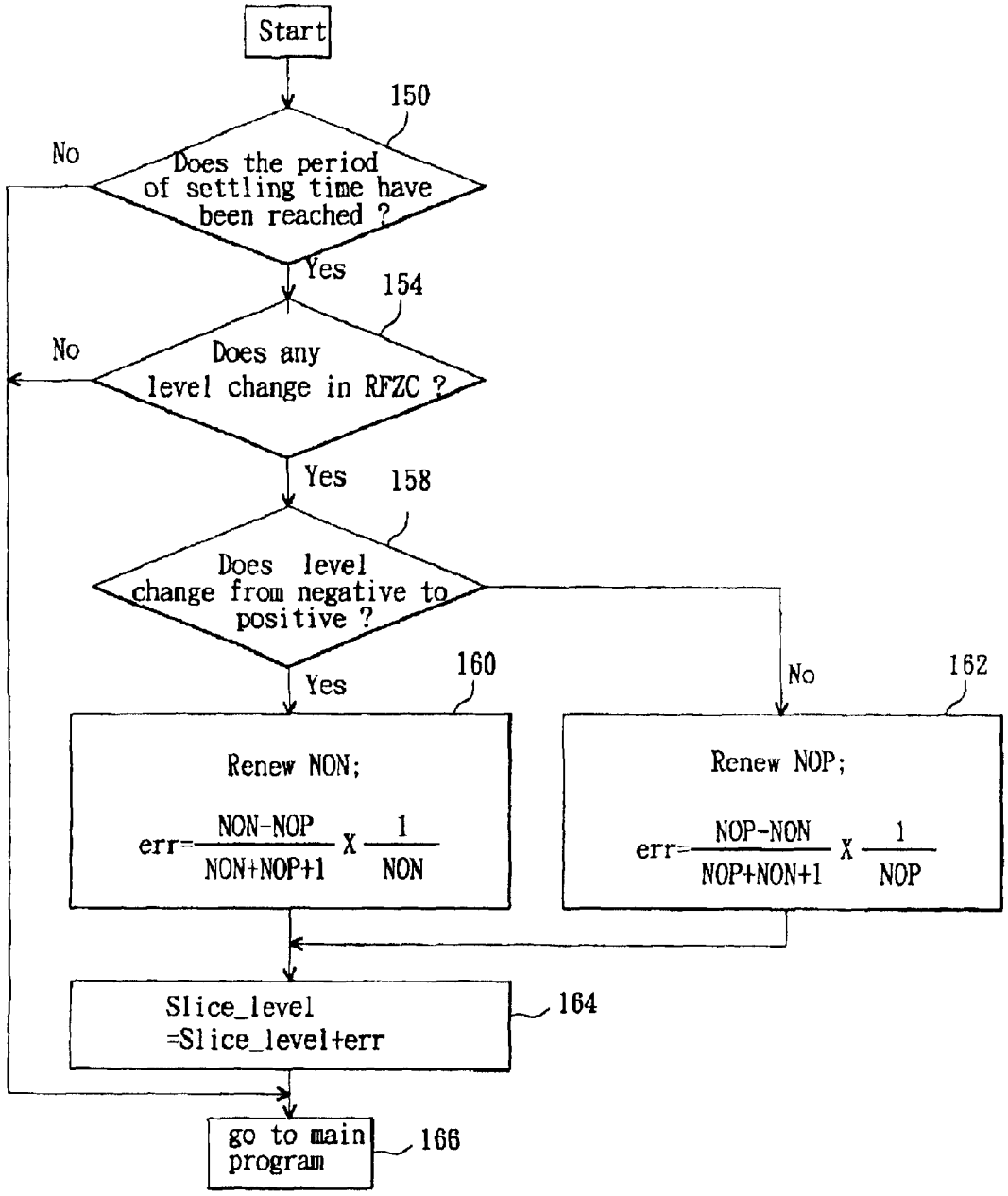
FIG. 6 is a flow chart of the embodiment of the present invention.

Referring to FIG. 6, which shows a flow chart of the embodiment of the present invention. The steps are described as follows. First, in the step 150, it is judged whether it is settled. If not, then the flow returns to the main program in the step 166. If the settling time is achieved, the level of the RFZC signal will be judged whether it is changed in the step 154. If not, then the flow returns to the main program. If the level of the RFZC signal is changed, the sampling of the previous half cycle is finished and the level is judged whether the level is changed from positive to negative or from negative to positive in the step 158. Afterward the error value is calculated by different equations. If the level is changed from negative to positive, the NON is updated and $$\text{err} = \frac{\text{NON} - \text{NOP}}{\text{NON} + \text{NOP} - 1} \times \frac{1}{\text{NON}}$$

is used to calculate the error value in the step 160. On the other hand, the NOP is updated, and the equation $$\text{err} = \frac{\text{NON} - \text{NOP}}{\text{NON} + \text{NOP} + 1} \times \frac{1}{\text{NOP}}$$

is used to calculate the error value in the step 162.

Finally, the error value from the calculation is added to the current slice level to become a next slice level in the step 164 and the flow goes to the main program in the step 166.

The advantage of this invention is that this invention provides a calibration method for the slice level of radio frequency zero cross signal. In this invention, the positive cycle and the negative cycle of the zero cross signal are sampled to calculate an error value. Moreover, adjusting the asymmetry between the positive cycle and the negative cycle of the zero cross signal is performed according to the change of the slice level.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A calibration method for a slice level of a signal in an optical storage device, comprising:

providing a current slice level of the signal;

comparing the current slice level with the signal to obtain a zero cross signal of the signal;

sampling the zero cross signal of the signal to obtain an error value; and generating a next slice level based on the current slice level and the error value.

2. The method of claim 1, wherein the sampling step comprises sampling a first half cycle and a second half cycle of the zero cross signal to obtain a first sampling number and a second sampling number.

3. The method of claim 2, wherein the step of obtaining the error value comprises obtaining the error value based on the first sampling number and the second sampling number.

4. The method of claim 2, further comprising:

updating the second sampling number when the zero cross signal is positive; and obtaining the error value based on the first sampling number and the updated second sampling number.

5. The method of claim 2, further comprising:

updating the first sampling number when the zero cross signal is negative; and obtaining the error value based on the updated first sampling number and the second sampling number.

6. A method for producing a zero cross signal of a signal in an optical storage drive, comprising:

providing a current slice level of the signal;

comparing the current slice level with the signal to obtain a current zero cross signal of the signal;

sampling the current zero cross signal of the signal to obtain an error value;

obtaining a next slice level based on the current slice level and the error value; and comparing the next slice level with the signal to obtain a next zero cross signal of the signal.

7. The method of claim 6, wherein the sampling step comprises:

sampling a first half cycle and a second half cycle of the zero cross signal to obtain a first sampling number and a second sampling number.

8. The method of claim 7, wherein the step of obtaining the error value comprises obtaining the error value based on the first sampling number and the second sampling number.

9. The method of claim 7, further comprising:

updating the second sampling number when the zero cross signal is positive; and obtaining the error value based on the first sampling number and the updated second sampling number.

10. The method of claim 7, further comprising:

updating the first sampling number when the zero cross signal is negative; and obtaining the error value based on the updated first sampling number and the second sampling number.

*11. A calibration method for a slice level of a signal in an optical storage drive, comprising:*

*sampling a zero cross signal of the signal to obtain an error value, wherein the zero cross signal is obtained by comparing a current slice level with the signal; and*

*generating a next slice level based on the current slice level and the error value.*

*12. The method of claim 11, wherein the sampling step comprises sampling a first half cycle and a second half cycle of the zero cross signal to obtain a first sampling number and a second sampling number.*

*13. The method of claim 12, wherein the step of obtaining the error value comprises obtaining the error value based on the first sampling number and the second sampling number.*

*14. The method of claim 12, further comprising:*

*updating the second sampling number when the zero cross signal is positive; and*

*obtaining the error value based on the first sampling number and the updated second sampling number.*

*15. The method of claim 12, further comprising:*

*updating the first sampling number when the zero cross signal is negative; and*

*obtaining the error value based on the updated first sampling number and the second sampling number.*

*16. A method for producing a zero cross signal of a signal in an optical storage drive, comprising:*

*sampling a current zero cross signal of the signal to obtain an error value, wherein the current zero cross signal is obtained by comparing a current slice level with the signal;*

*obtaining a next slice level based on the current slice level and the error value; and*

*comparing the next slice level with the signal to obtain a next zero cross signal of the signal.*

*17. The method of claim 16, wherein the sampling step comprises:*

*sampling a first half cycle and a second half cycle of the zero cross signal to obtain a first sampling number and a second sampling number.*

*18. The method of claim 17, wherein the step of obtaining the error value comprises obtaining the error value based on the first sampling number and the second sampling number.*

*19. The method of claim 17, further comprising:*

*updating the second sampling number when the zero cross signal is positive; and*

*obtaining the error value based on the first sampling number and the updated second sampling number.*

*20. The method of claim 17, further comprising:*

*updating the first sampling number when the zero cross signal is negative; and*

*obtaining the error value based on the updated first sampling number and the second sampling number.*

* * * * *